May 3, 1927.

E. BOLTON ET AL 1,627,142

STONE CUTTING MACHINE

Filed June 19 1926

Inventor
F. D. Bolton,
Earl Bolton,
By Clarence A. O'Brien
Attorney

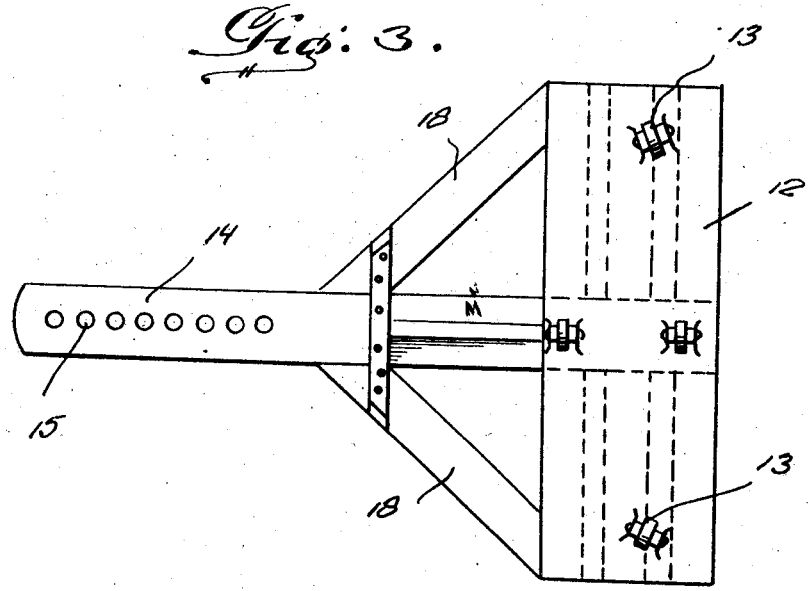
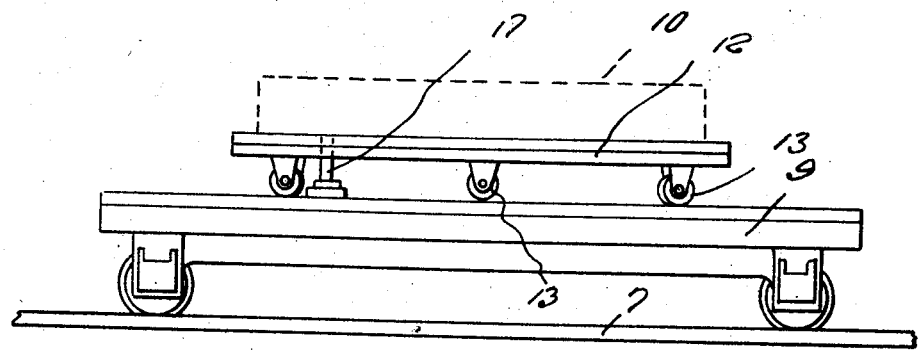

Patented May 3, 1927.

1,627,142

UNITED STATES PATENT OFFICE.

EARL BOLTON AND FLOYD D. BOLTON, OF TULSA, OKLAHOMA.

STONE-CUTTING MACHINE.

Application filed June 19, 1926. Serial No. 117,094.

This invention relates to an improved stone cutting machine which is especially, but not necessarily, adapted for severing arcuate bodies of stone into segments such as may be more conveniently handled in stone construction work.

At the present time, stone cutting machines with which we are familiar are of such construction that considerable difficulty is experienced in properly and accurately severing arcuate blocks into uniform segments or segments of desired sizes, this being due to the fact that much time and inconvenience is experienced in striking the proper radial line of cut on the block of stone.

The present invention, therefore, has reference to a structure which permits the present apparatus to be modified to move the block of stone to position with respect to the path of movement of the circular cutting saw to insure proper radial cuts through the blocks for dividing the same into equal segments or segments of the desired proportion.

Briefly, the invention simply has reference to a swingably mounted support for the stone block, this being pivotally connected at one end on one of the usual roller supported cars and being supported by rollers at its opposite ends on a complemental car, whereby upon anchoring the first named car to the track, and moving the complemental car, the support may be swung to a position to properly line the block of stone with the traveling saw on the machine.

The features and advantages of the improved construction will become apparent from the following description and drawings.

In the accompanying drawings forming a part of this application and in which like numerals are employed to designate like parts throughout the same, Figure 1 is a side view of a machine reconstructed in accordance with the present invention.

Figure 3 is a bottom plan view of the swingably mounted supplemental block supporting member.

Figure 4 is an end elevation looking from right to left in Figure 1.

Figure 1:
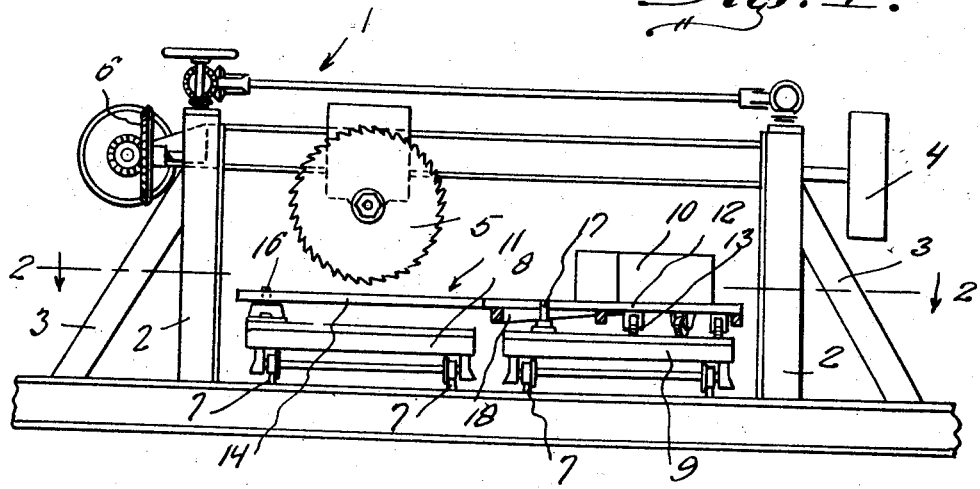

Referring to the drawings in detail it will be seen that the reference character 1 designates generally the usual cutting machine which includes among other parts, supporting standards 2, braces 3, a drive pulley 4, customary circular cutting saw 5, gearing 6, and so on. Extending beneath the top beam of the machine are the rails 7 of a pair of tracks upon which cars 8 and 9 are supported for movement. These are the customary carrier cars of the low-down type. The block of stone is represented by the reference character 10, and as before stated, a supplemental supporting member 11 is provided for support. The supporting member comprises a platform 12 upon which the stone block is placed, there being appropriately arranged rollers 13 supported on the under side of this to facilitate swinging in an arcuate path when the car 9 is moved. Extending from the center of the rear of this platform is a supporting beam 14 which is shown in Figure 3 as provided with a plurality of longitudinally spaced holes 15 for selective reception upon the pivot pin 16 on the car 8. It will be noted that the pivot 16 is supported on a mound which maintains the beam 14 in a plane with the supporting rollers 13, and this disposes the block of stone in a position to be cut by the saw 5. Then too, there is a pin 17 rigidly mounted upon the platform of the car 9 in a position to engage one of the side braces 18 disposed between the platform 12 and the intermediate portion of the beam 14.

Figure 2:
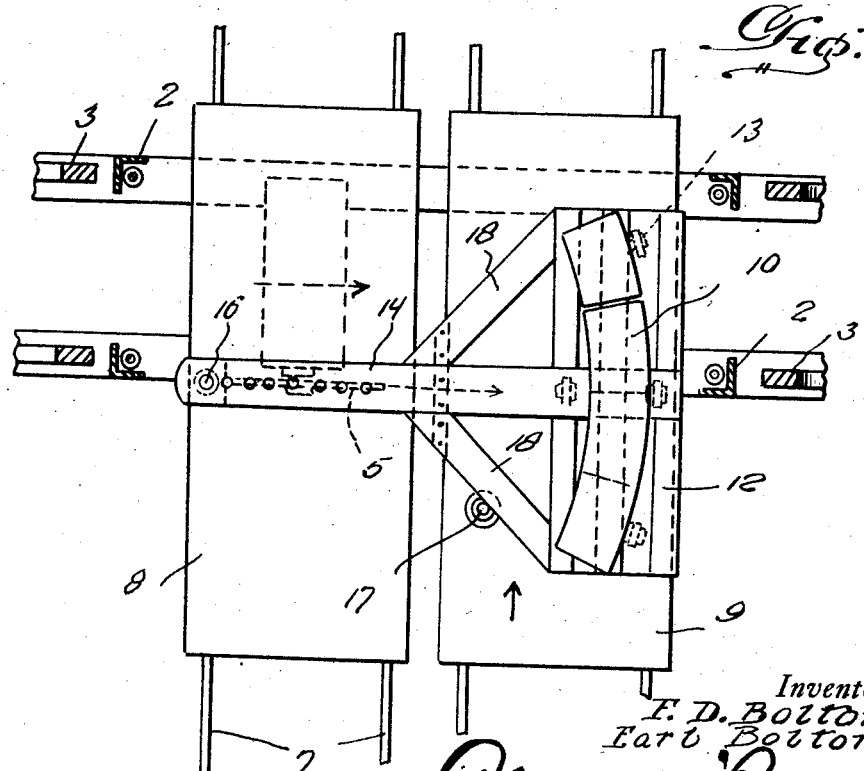
Figure 2 is a horizontal section taken approximately upon the plane of the line 2—2 of Figure 1.

In operation the car 8 is made fast to its supporting rails 7 by appropriate clamps, the same being arranged so that the pivotal connection 16 between it and the beam 14 will be in substantial alignment with the saw 5. Assuming then that the car 9 is permitted to move and that the block of stone 10 is supported on the platform of the member 11 by arranging the two cars in the relation shown in Figure 2, the block of stone will be severed at a point centrally of its ends. However, by moving the car 9, the supporting member 11 will be moved with it about the pivot 16 and owing to the arcuate movement of the supporting member, it will dispose the next portion of the stone in a position to insure the proper radial cut. Obviously, this arrangement and association will permit the stone block to be severed into accurate arcuate segment.

Undoubtedly, by considering the description in connection with the drawings, persons familiar with the structures of this class will be able to obtain a clear understanding of the same. Therefore, a more detailed description is thought unnecessary.

Minor changes coming within the field of invention claimed may be resorted to if desired.

Having thus described the invention, what we claim as new and desire to secure by Letters Patent is:—

1. In a structure of the class described, a supporting structure, a cutting saw mounted thereon, spaced tracks disposed beneath said supporting structure, roller supported cars mounted on said track, one of said cars being fixed to the rails of its respective tracks, and the other car being movably supported on the rails of its respective tracks, and a stone supporting member pivotally connected at one end to the stationary car and movably mounted at its opposite ends on the movable car.

2. In a structure of the class described, spaced parallel tracks, roller supported cars on said tracks, one of said cars being fixedly connected with the rails of its respective tracks, the other car being movably mounted on the rails of its track, a cutting saw mounted above said car, and stone supporting member including a platform upon which the stone is adapted to be disposed, and a beam extending from said platform and pivotally connected to the fixedly mounted car at a point beneath said cutting saw, and rollers carried by said platform and movably arranged on the relatively movable car.

In testimony whereof we affix our signatures.

FLOYD D. BOLTON.
EARL BOLTON.